US 8,579,996 B2

(12) United States Patent
Humphreys

(10) Patent No.: US 8,579,996 B2
(45) Date of Patent: Nov. 12, 2013

(54) PROCESS AND APPARATUS FOR CONVERTING ORGANIC MATTER INTO A PRODUCT

(75) Inventor: Leonard James Humphreys, Roseville Chase (AU)

(73) Assignees: Ignite Energy Resources Pty Ltd, Somersby, NSW (AU); Licella Pty Ltd, Somersby NSW (AU)

( * ) Notice: Subject to any disclaimer, the term of this patent is extended or adjusted under 35 U.S.C. 154(b) by 515 days.

(21) Appl. No.: 12/670,838

(22) PCT Filed: Mar. 26, 2008

(86) PCT No.: PCT/AU2008/000429
§ 371 (c)(1),
(2), (4) Date: Jun. 15, 2010

(87) PCT Pub. No.: WO2009/015409
PCT Pub. Date: Feb. 5, 2009

(65) Prior Publication Data
US 2010/0287825 A1    Nov. 18, 2010

(30) Foreign Application Priority Data
Jul. 27, 2007  (AU) .................................. 2007904037

(51) Int. Cl.
*C10L 1/182* (2006.01)
*B01J 3/00* (2006.01)

(52) U.S. Cl.
USPC ........................................... 44/451; 422/242

(58) Field of Classification Search
USPC .............. 210/759; 585/241; 44/451; 422/242
See application file for complete search history.

(56) References Cited

U.S. PATENT DOCUMENTS

| 4,792,408 | A |   | 12/1988 | Titmas |
| 5,232,604 | A | * | 8/1993 | Swallow et al. ............. 210/759 |
| 5,358,646 | A |   | 10/1994 | Gloyna et al. |
| 5,516,952 | A | * | 5/1996 | Lee et al. ...................... 585/241 |
| 6,090,291 | A |   | 7/2000 | Akai et al. |
| 6,878,290 | B2 |  | 4/2005 | Joussot-Dubien et al. |
| 2004/0011746 | A1 | | 1/2004 | Joussot-Dubien et al. |

FOREIGN PATENT DOCUMENTS

| EP | 1489046 A1 | 12/2004 |
| EP | 1834928 A1 | 9/2007 |
| JP | 2002-361068 A | 12/2002 |
| JP | 2003-033746 A | 2/2003 |

(Continued)

OTHER PUBLICATIONS

Australian Examination Report, Australian Application No. 2008281299, Jun. 12, 2012, 3 pages.

(Continued)

*Primary Examiner* — Prem C Singh
*Assistant Examiner* — Chantel Graham
(74) *Attorney, Agent, or Firm* — Fenwick & West LLP

(57) ABSTRACT

A process for treating organic matter to convert it into a product comprises the step of contacting the organic matter with supercritical liquid whereby it reacts to form the product. The liquid may be heated by an external heating medium, or may be heated internally of the process by co-feeding an oxidising agent with the liquid. This agent can be in an amount that is predetermined to control the extent to which the reaction mixture is heated. The heat can be supplied to provide sufficient activation energy for the process reaction to occur with sufficient speed and for the liquid to attain sufficient characteristics to cause the reaction.

8 Claims, 2 Drawing Sheets

(56) References Cited

FOREIGN PATENT DOCUMENTS

| | | | |
|---|---|---|---|
| JP | 2004131560 | * | 4/2004 |
| WO | WO 81/00855 A1 | | 4/1981 |
| WO | WO 94/18128 A1 | | 8/1994 |
| WO | WO 2006/061448 A1 | | 6/2006 |

OTHER PUBLICATIONS

Chinese First Office Action, Chinese Application No. 200880100837.6, Mar. 7, 2012, 5 pages.

Chinese Second Office Action, Chinese Application No. 200880100837.6, Mar. 1, 2013, 7 pages.

European Extended Search Report, European Application No. 08714471.3, Jul. 27, 2012, 6 pages.

International Search Report, PCT Application No. PCT/AU2008/000429, Jun. 6, 2008, 3 pages.

International Written Opinion, PCT Application No. PCT/AU2008/000429, Jun. 6, 2008, 5 pages.

New Zealand Examination Report, New Zealand Application No. 583052, Nov. 9, 2010, 2 pages.

New Zealand Examination Report, New Zealand Application No. 599850, May 10, 2012, 2 pages.

Russian Office Action, Russina Application No. 2010107236/5(010076), Feb. 26, 2010, 7 pages.

International Preliminary Report on Patentability, PCT Application No. PCT/AU2008/000429, Nov. 10, 2009, 10 pages.

* cited by examiner

PROCESS AND APPARATUS FOR CONVERTING ORGANIC MATTER INTO A PRODUCT

TECHNICAL FIELD

A process and apparatus are disclosed for the conversion of organic matter into a product. The process can be applied to many types of organic matter having different moisture contents and chemical compositions. One specific exemplary process is the conversion of lignite into various fuel products. Other example uses of the process can include the decomposition of organic matter such as lignocellulosic and plastic or polymer feedstocks.

BACKGROUND ART

Lignite, often referred to as brown coal, is the lowest rank of coal and is used almost exclusively as fuel for steam-electric power generation. It is brownish-black and has a high inherent moisture content, sometimes as high as 66 percent, and very high ash content compared with bituminous coal. It is also a heterogeneous mixture of compounds for which no single structural formula will suffice. Lignite has characteristics that put it somewhere between black coal and peat. When dried, it crumbles easily. It is found in abundance in many areas around the world including the United States, Australia, Canada, Greece and Germany where it is generally used as a fuel for generating electricity. A significant amount of the electricity generated in those countries comes from the combustion of lignite.

The potential heat content of lignite varies widely depending on the moisture content, the source and the combustion technology. Because of its low energy density, brown coal is inefficient to transport and is not traded extensively on the world market compared with higher coal grades, such as black coal. Brown coal is often burned in power stations constructed very close to any mines, such as in Australia's Latrobe Valley. These mines are rarely underground due to the location of the coal close to the surface, and strip mining is usually practiced. Carbon dioxide emissions per unit power generated are generally much higher from brown coal fired plants than comparable black coal plants. The moisture content of lignite normally necessitates drying of the feed prior to combustion in a power station, which adds to the cost and complexity of the process.

The continued operation of brown coal plants, particularly in combination with strip mining, is widely criticised on environmental grounds. As a result there is a need to find ways of generating high value product fuel stream(s) from a lignite deposit.

It is to be understood that, if any prior art information is referred to herein, such reference does not constitute an admission that the publication forms a part of the common general knowledge of a person of ordinary skill in the art, in Australia or any other country.

SUMMARY OF THE DISCLOSURE

In a first aspect a process for treating organic matter to convert it into a product is provided, the process comprising the step of contacting the organic matter with supercritical liquid whereby it reacts to form the product, wherein the liquid may be heated by an external heating medium or may be heated internally of the process by co-feeding an oxidising agent with the liquid, this agent being in an amount that is predetermined to control the extent to which the reaction mixture is heated.

In this process the heat is supplied to provide sufficient activation energy for the process reactions to occur with sufficient speed and for the liquid to attain characteristics sufficient to aid the process reactions.

Throughout this specification when the terminology "supercritical" is used, it refers to a temperature and pressure condition in which at least part of the processing liquid reaches its critical point and becomes a fluid with unique properties. The resulting fluid has a density between that of its vapour and its liquid phase at standard conditions, and exhibits high gas-like diffusion rates along with liquid-like solvation behaviour. In the case of water this means that hydrocarbons, for example, can become soluble in the water and salts might precipitate out of solution.

In general, these reaction conditions are characterised by being of higher temperature than the boiling point of the liquid and at least near the supercritical temperature thereof, and pressures well above atmospheric and at least near the supercritical state.

Furthermore, when the when the terminology "supercritical" is used, it should be understood that this can also include conditions which are just below supercritical where the liquid does not retain 'normal' fluid properties but is also not yet fully supercritical. This condition is sometimes known in the art as a "sub-critical liquid", and is it expected that the present process will sometimes dip into this region due to the conversion reactions taking place, even if the system nominally operates under supercritical conditions. In other words, there may be a change in super- to sub-critical states at least temporarily during some stages of the process. This may even be a preferred mode of operation as, for instance, operation in the sub-critical region for a period may make fewer physical demands on the chosen process equipment.

When the term "organic matter" is used throughout this specification, it is to be understood that this can, include organic solid, or a mixture of an organic solid in a liquid, where the liquid may be aqueous or even an organic liquid, such as a solvent or an alcohol. It is also to be understood that the process may convert at least some of the organic solid into an organic liquid prior to the chemical decomposition step which forms the product solids and liquids. In that sense, the "organic matter" may include solid which is converted to be an organic liquid prior to, at or during the moment of treatment. The feed "organic matter" can even be a suspension or solution of solid material in a liquid. In some instances, such a suspension or solution can even be recirculated or recycled so as to be treated a second time by the process.

The process provides a technique for the controlled chemical decomposition of organic matter. When followed by collection of the decomposition products and a separation thereof, the separated products can collectively be of higher value than the unprocessed organic matter, and can be suitable for specific end uses.

The process can also effectively treat wet organic solids without the need to pre-dry the solid. The organic solid can simply be milled and slurried and then processed by contact with the supercritical liquid.

The supercritical liquid conditions may be achieved by heating a fixed volume of liquid to enable the generation of pressure, either by autogenous means (static system) in which the pressure develops by heating the liquid in a fixed volume; or by the application of a high pressure pump (continuous system), such as a slurry pump, or using other specific types of pressurising apparatus or vessel, such as gravity-based devices.

In one form of this, the liquid may be heated by an external heating medium.

In another form of this the liquid may be heated internally within the process itself by combustion of some of the organic matter using the oxidising agent. For example in supercritical water ('wet') oxidation, a 'flame' can be generated inside the medium to create instabilities and further chemical reactions. The oxidising agent can be present only in a sufficient quantity to allow a small percentage of the organic matter to be combusted so as to generate a suitable amount of heat to establish the temperature range appropriate for the liquid to attain its sub-/supercritical characteristics and for the process to form the product with sufficient speed.

In one embodiment of the process, the supercritical liquid conditions can be achieved by hydrostatic pressurisation. In one form of this, the said pressurisation may be achieved by locating the liquid in a sub-terrestrial or sub-oceanic vessel.

In one embodiment of the process, the oxidising agent can be selected from one or more of the group comprising oxygen, hydrogen peroxide and sodium nitrate. Other oxidising agents, such as alternative sources of oxygen, are within the scope of the disclosure.

In one embodiment of the process, the supercritical liquid can be water with a pressure of greater than about 220 bar and sometimes as much as 300 bar. Furthermore, in one embodiment of the process, the supercritical liquid may be water with a temperature of between 350 and 420° C., for example 400° C.

In one embodiment of the process, the organic solid can be one or more of the group comprising a lignite or brown coal, lignin, cellulose, hemicellulose, organic wastes, and plastic or any polymer in general.

In one embodiment of the process, the liquid can be one or more of the group comprising a water, methanol and ethanol. For example, the liquid can be 100 percent of any of these, or mixtures thereof. Example water-alcohol mixtures include those with ratios of 100:0, 90:10, 80:20, 70:30 and 20:80, 10:90 and 0:100. In such cases the reaction conditions are characterised by being of higher temperature than any of the boiling points of the above-mentioned liquids and usually lie near the sub- or supercritical temperature of at least one of them. The reaction pressures can also be well above atmospheric and close to those near the sub- or supercritical state.

In one embodiment of the process, the chemically decomposed product can comprise a fuel.

In one embodiment, the chemically decomposed product can comprise a liquid phase of petroleum products, mainly such as substituted aromatics, diesel oil, asphaltenes and pre-asphaltenes. Some of these products can also be relatively sulphur-free and of a higher octane or cetane number than regular gasoline or diesel fuel. This may be a high value commodity.

In one embodiment of the process, the chemically decomposed product can comprise a solid phase mainly including char. This is a relatively lower value commodity compared with the liquid phase product.

In one embodiment of the process, the chemically decomposed product can comprise a gas phase mainly including methane, hydrogen, carbon monoxide and carbon dioxide.

In one embodiment of the process, the organic solid can be present in a ground particulate form suitable for mixing into a slurry. In such an embodiment the organic solid may have been milled or ground to a relatively fine size distribution to enable the slurry to be formed.

In one embodiment of the process, when the organic matter is present as a slurry, the ratio of liquid to solid in the slurry can be less than about 12:1. In one particular form, the ratio of liquid to solid in the slurry can be more than about 2:1.

In one embodiment of the process, the chemical decomposition of the organic matter is by depolymerisation, representing a breakdown of the starting materials into smaller, simpler compounds.

In a second aspect an apparatus for treating organic matter is provided, the apparatus arranged to convert the organic matter into a product upon contact with a supercritical liquid, and comprising:

an oxidising agent introduction device for introducing a predetermined amount of a source of oxygen into contact with the organic matter; and a reactor, wherein the reactor comprises a reaction zone in which chemical decomposition of the organic matter to form the product occurs, the reaction zone arranged for the in use containment of supercritical liquid.

In one embodiment, the oxidising agent introduction device can comprise a metering device arranged for delivering a source of the agent into or prior to the reactor, sufficient for a partial or controlled combustion of some of the organic matter.

In one embodiment, the reactor can be a sub-terrestrial or sub-oceanic vessel positioned at a depth whereby sufficient pressurisation (determined by the terrestrial pumping pressure) of the liquid to supercritical conditions occurs in use. In one form of this, the reaction zone may be located in a lowermost region of the vessel which experiences a maximum pressure.

One example of a sub-terrestrial vessel can be a vertical drill shaft. In one form, the drill shaft can be arranged with a pipe that is concentric with the shaft and which is arranged for the in use delivery of a flow of organic matter to the reaction zone. In one form of this, an annular concentric space around the pipe and within the drill shaft may be arranged for the in use delivery of a flow of product from the reaction zone to an uppermost end of the vessel.

In an alternative embodiment of the apparatus, the sub-oceanic vessel can be a flexible tube. In one form of this, the tube is arranged with a pipe that is concentric with the tube and which is arranged for the in use delivery of a flow of organic solid to the reaction zone.

In one arrangement of such a tube, the apparatus can have an annular concentric space around the pipe and within the tube, being arranged for the in use delivery of a flow of product from the reaction zone to an uppermost end of the vessel.

In an alternative embodiment, the reactor can be a serpentine tubular reactor type, designed to avoid settling of solids present in slurries. Such a reactor includes many relatively narrow tubes which can convey slurry therethrough at a high volumetric flow rate. Such a reactor may also include an alternate arrangement of large and narrow diameter tubes to adjust residence time, whilst ensuring adequate flow regimes to avoid sedimentation.

In a further alternative embodiment, the reactor can be an above-ground, tall column reactor which is able to be pressurised.

In one embodiment, the apparatus further comprises a depressuriser located after the vessel and arranged for depressurising the product before it is discharged for subsequent handling and product separation.

BRIEF DESCRIPTION OF THE DRAWINGS

Notwithstanding any other forms which may fall within the scope of the process and apparatus as set forth in the summary, specific embodiments of the process and apparatus will now be described, by way of example only, with reference to the accompanying drawings in which.

DETAILED DESCRIPTION OF SPECIFIC EMBODIMENTS

Figure 1:
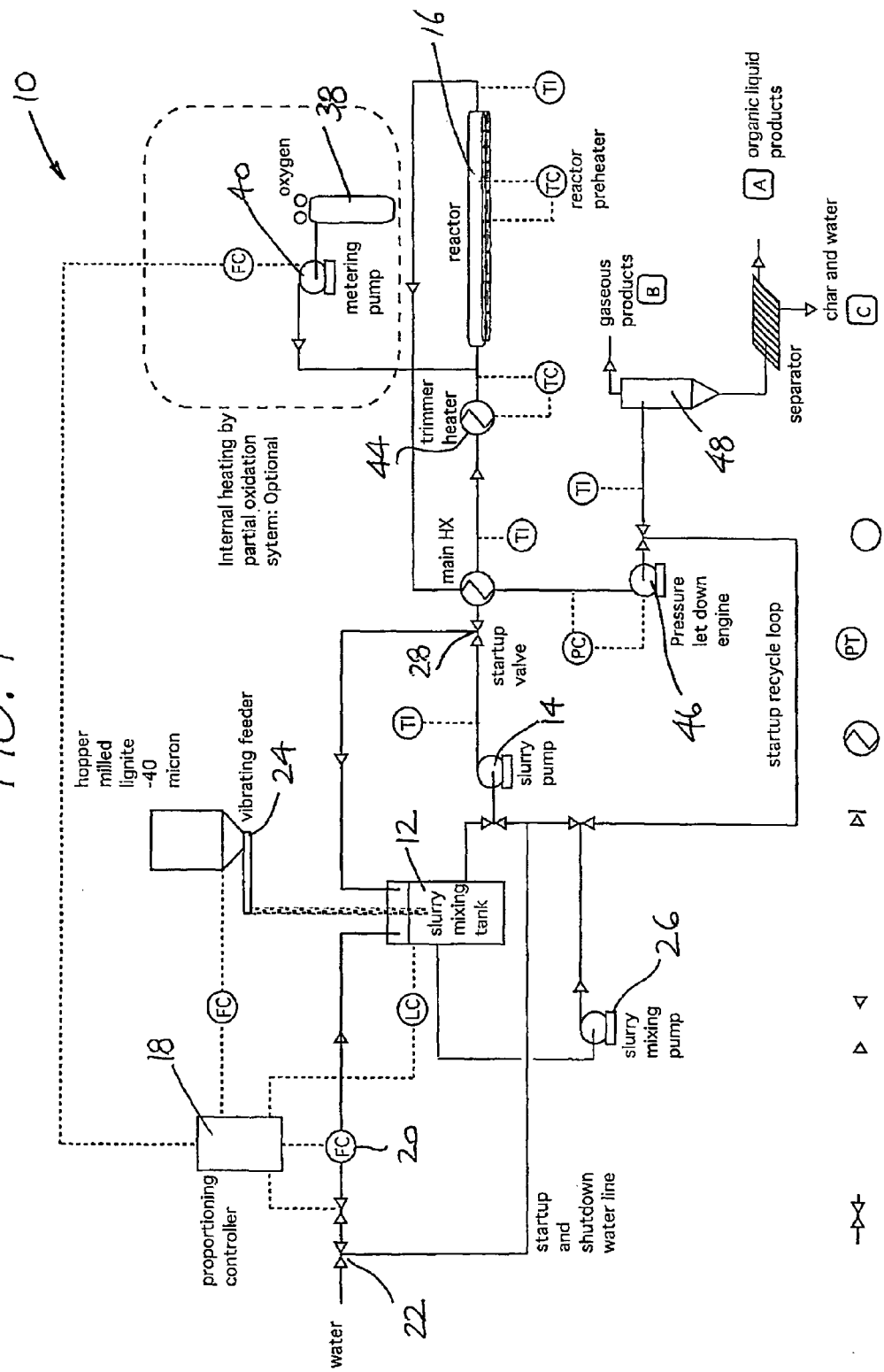
FIG. 1 shows a process flow diagram for converting organic matter into a product by contact with supercritical liquid, in accordance with an embodiment.

Referring to the drawings, some process flow diagrams are given for the treatment organic matter in the form of lignite by contacting the lignite with a supercritical liquid (SCL). The SCL treatment converts the lignite into a usable fuel product. The process involves contacting the lignite (which can be present as a mixture of slurried solids and water) with SCL which may be heated by an external heating medium, or may be heated internally by a specific amount of oxidising agent.

In the case of internal heating, the amount of oxidising agent that is introduced is predetermined to control the extent to which lignite is burned in a controlled combustion step, and therefore how much heat can be generated for the chemical decomposition or depolymerisation (under supercritical conditions) of the remaining unburnt lignite. The liquid in the lignite slurry becomes heated and, in combination with a high-pressure atmosphere, conditions are created that engender chemical reactions, one of these the liquefaction of some of the lignite. To generate sufficient heat to achieve sub-/supercritical conditions in the internal heating mode, only a relatively small percentage of the lignite needs to be combusted.

Referring now to the schematic process flow chart shown in FIG. 1, an exemplary design is shown for extracting fuels from lignite using a supercritical liquid, which may be water or a mixture of water and alcohols. The plant 10 takes milled graded lignite and, for example, water and meters these materials into a slurry tank 12 before being fed to a high pressure pump 14 which sends the slurry to the reactor 16. The level in the slurry mixing tank 12 is monitored by a level controller 18. A flow controller 20 and valve 22 meter the water into the tank 12.

Suitable lignite can be supplied already milled and screened to a selected size for use in the plant, for example 100% less than 40 microns. Lumps and larger particles are to be avoided to prevent reactor tube blockage. The flow rate of feed lignite is measured and proportioned by controlling a vibrating feeder 24 which delivers the powdered lignite into the slurry mixing tank 12. The contents of this tank 12 are mixed using an external centrifugal slurry pump 26, although in alternative arrangements a stirrer/impeller can be used. When the level on this tank 12 becomes high, the controller 18 shuts off both water and lignite.

The slurry pump 14 is capable of delivering slurry into the reactor with a pressure of around 250 bar and up to over 300 bar. During operation, the output of this pump 14 may be directed via start-up valve 28 into the process reactor 16, and in one operating configuration some of the flow is cycled back into the slurry tank 12.

Start-up involves feeding water only to the reactor 16 so that the liquid flows are running at steady state. Three-way valves allow the effluent from the process reactor 16 to be placed into the input. At this point there is no lignite in the slurry mixing tank 12. The vibrating feeder 24 that delivers the stream of lignite is switched on and the level in the slurry tank 12 automatically remains constant by adding both water and lignite in the required proportions. The lignite concentration increases steadily and, as it does, the lignite concentration of slurry flowing to the reactor 16 increases likewise. Keeping the slurry in motion prevents solids from settling out and blocking a pipe or tank. The reverse procedure is used for shutdown, in which the water flow is continued while the solids are shut off and a complete purge is done.

The process reactor 16 needs to operate under conditions of slurry flow without plugging. In one form, the reactor can be of the serpentine tubular reactor type, made from vertically oriented tubing with 180 angle degree bends which are entirely contained inside an insulated structure. Such an arrangement allows for solids to be present in the feed slurry without significant risk that they will settle out in the tubing and cause blockages. When a slurry is pumped vertically the particles do sediment but not onto a surface. Generally the velocity of the stream needs to be greater than the hindered settling velocity of the slurry.

The reactor also needs to be of a type suitable for the in use containment of supercritical liquid in a reaction zone. This is an aggressive environment both in terms of temperature and pressure. A design working pressure in such a reactor is up to 315 bar at 500° C. with 300% safety factor.

Figure 2:
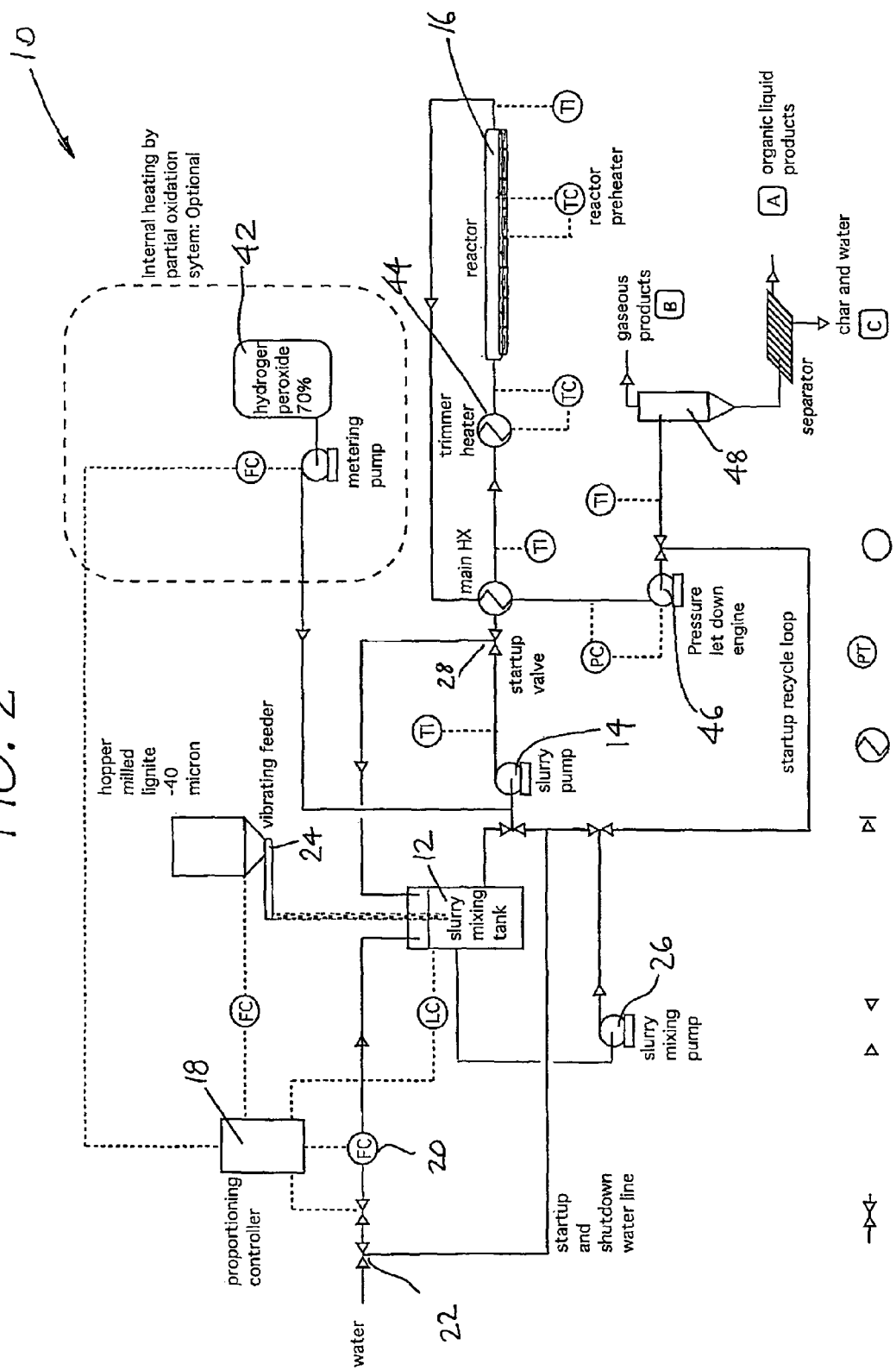
FIG. 2 shows a process flow diagram for converting organic matter into a product by contact with supercritical liquid, in accordance with another embodiment.

When the lignite slurry is flowing through the plant 10, and the slurry is to be heated internally of the process, an oxidising agent is metered into the reactor inlet stream in a quantity that is sufficient to permit burning of about 2-5% of the lignite in the reactor so as to generate heat. In one embodiment, oxygen gas is delivered via a metering pump 40 from a cylinder source 38. In an alternative arrangement shown in FIG. 2 (which is in all respects similar to FIG. 1 with the exception of the source of oxygen input), the oxygen source can be in the form of hydrogen peroxide concentrate liquid 42 which is metered directly into the inlet of the slurry pump 14 with the water and lignite, via a pitot tube, gas inlet portal or the like.

To avoid overheating during operation, the oxygen or peroxide concentration is increased gradually to allow the temperature of the reactor 16 to stabilise. As the extra heat of combustion is released and the reactor temperature rises, the demand on an electric trimmer heater 44 will fall as heated slurry is returned to the feed flow. Eventually the oxygen or peroxide concentration (and the oxidation that occurs) allows for all of the heat required to be generated in the reactor by internal oxidation of the lignite. At this point the electric trimmer heater 44 can be taken off-line.

A challenge with SCL's arises from their low densities. In a two-phase flow system like this, the fluid phase provides the motive force for the solids. Ordinary water-lignite slurry can be kept in suspension by giving it sufficient agitation. By contrast the specific gravity of supercritical water is only about 0.2, as opposed to 1.0 for ambient temperature and pressure water, and thus the tendency of the solids to sediment is greatly increased. The ramifications for reactor design are significant. The flow needs to minimise solid sedimentation onto any pipe surface. It can also be helpful if the particles of lignite are milled very small so that they sediment more slowly.

The use of supercritical water (>220 bar and >350° C. and <420° C.) in the reactor 16 converts the lignite into smaller molecules that resemble heavy petroleum fractions, commonly referred to as oil, asphaltenes and pre-asphaltenes, and also yielding residual char, gas (mostly carbon dioxide) and produced water as the main products.

A pressure let down engine 46 can be used at the tail end of the process.

The products can then be passed to a cyclone or a separation tank 48 so that gases B can be vented and liquids A and solids C collected. Then the solid product C can be separated from the liquid products A by filtration. The liquid product A approximates a diesel petroleum product, and can include substituted aromatics, diesel oil, asphaltenes and pre-asphaltenes. This may be a high value commodity which can be sold directly to a refinery operation. The solid product C mainly includes high quality char, comparable to low-sulphur, high grade porous black coal. This product could be sold as a general combustible to the nearest dried-lignite power station for a price competitive with the cost of dried lignite itself. Finally, the gas product B includes hydrogen, methane carbon mon- and dioxide, and depending on its composition, could be sold as a fuel or simply vented to atmosphere. Collectively the separated products are of higher value than the unprocessed lignite material.

It should be noted that in other embodiments the process can also effectively treat wet organic solids without the need to pre-dry the solid. Rather than dry powdered lignite, a milled and slurried form of lignite can be used as a feedstock for processing by contact with SCL. In this way, lignite mined in its naturally wet state can be processed and used without a pre-drying step.

The abovementioned "surface" plant operates at highly elevated pressures and also at high temperatures with supercritical conditions. This means that the capital costs of the equipment are likely to be high, and the material specifications quite demanding. An alternative arrangement is a deep-shaft terrestrial reactor/heat exchanger that relies on subterranean pressure created by a long column of water in the shaft. A further alternative arrangement is a sub-oceanic apparatus that uses the depth of the ocean to provide the pressure.

The major advantages of these concepts are: (i) low pressure equipment only is required because the entire reactor and heat exchanger are externally pressurised and (ii) the running costs of pumping to great pressure (plus the capital costs of reducing the pressure again) are eliminated. It is envisaged that the subterranean shaft would be of the order of 3 to 4 kilometres deep (or 0.5 to 1.5 km when used in combination with a high pressure surface pump), while the undersea option requires a plant built on a ship.

At the bottom of a subterranean shaft 3 km deep, the pressure of a column of liquid water would be about 300 bar. A reactor situated here does not need to be made of pressure-rated equipment. The pressure would be made by the column of water above it. Similarly the heat exchanger need not be built with a pressure rating. A pipe concentric with the larger shaft can deliver a water-lignite slurry to the reactor at the base of the shaft. The annular concentric space allows the product to return to the surface. This arrangement therefore functions as a heat exchanger for the product coming out against the feed going in.

Furthermore, there is no need for a high-pressure pump because the column of water in the shaft supplies the pressure. There is a lower operating cost because of the lower pumping costs and a high degree of safety compared with the use of high pressure equipment at the ground surface. When positioned underground there is a very low risk of high-pressure failure or explosion. A reactor volume could be made larger by excavating a space at the bottom of the shaft to the required residence volume. The shaft volume would be large but there is an advantage in an underground reactor that it would be possible to run the reaction at a higher temperature say 500° C. (about 100° C. hotter than the surface-based version 16) which would have the effect of reducing the residence volume and therefore the cost. The addition of a pre-determined amount of a source of oxidising agent into the slurry to oxidise some of the lignite can raise the slurry temperature to the required level. Metering of the oxidising agent can be used as the temperature-control parameter. Overall, the technique lends itself to using higher temperatures and therefore a smaller reactor space.

In a further example, the reactor and heat exchanger can be made into a module which is lowered into a deep-sea trench from a ship. The module can be built relatively cheaply from low-pressure equipment because the sea depth would provide a counter pressure. Cheap flexible rubber hoses would provide the feed and the return lines for the product stream. Again no high pressure is required for the feed because the depth of the plant does this automatically. One advantage of the undersea module is that the entire module can be hauled up for maintenance as required.

Another advantage of an undersea option can be the use of ceramics for the reactor body itself, instead of stainless steel. Ceramics normally do not have a good pressure rating and thick metal pipe is used instead. The use of ceramics for this purpose at around 300 bar is not possible. However as there is no net pressure on a reactor in an undersea arrangement, if the reactor is manufactured from ceramics it can be operated at a much greater temperature (as is the case for the deep shaft reactor). This can reduce the reaction residence time and lower the cost of the reactor.

Whilst the process and apparatus for converting organic matter into a product has been described with reference to a number of preferred embodiments it should be appreciated that the process and apparatus can be embodied in many other forms.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the process and apparatus.

The invention claimed is:

1. A process for converting organic matter into a product, the process comprising
producing a reaction mixture comprising water and the organic matter, and
heating the reaction mixture to a temperature of between 350° C. and 420° C. and a pressure of greater than about 220 bar to produce supercritical or subcritical water and thereby convert the organic matter into the product, wherein
the supercritical or subcritical water is produced internally of the reaction mixture by heating in a fixed volume,
the organic matter comprises lignite (brown coal) or a combination of hemicellulose, cellulose and lignin, and
the product comprises a liquid phase of petroleum products and either or both of: (i) a solid char product; (ii) a gas product comprising one or more of methane, hydrogen, carbon monoxide.

2. The process according to claim 1, wherein said heating comprises combustion of at least a portion of the organic matter with an oxidizing agent.

3. The process according to claim 2, wherein the reaction mixture comprises a predetermined amount of said oxidizing agent to control the extent to which the reaction mixture is heated.

4. The process according to claim 2, wherein the oxidizing agent is selected from one or more of oxygen, hydrogen peroxide and sodium nitrate.

5. The process according to claim 1, wherein producing the supercritical or subcritical liquid comprises pressurizing the reaction mixture in a sub-terrestrial or sub-oceanic vessel using pressure external to said vessel.

6. The process according to claim 1, wherein the reaction mixture further comprises supercritical or subcritical methanol and/or ethanol.

7. The process according to claim 1, wherein the organic matter is in the form of a slurry having a ratio of liquid to solid of less than about 12:1.

8. The process according to claim 1, wherein the organic matter is in the form of a slurry having a ratio of liquid to solid of more than about 2:1.

\* \* \* \* \*